(12) United States Patent
Lee

(10) Patent No.: US 6,217,758 B1
(45) Date of Patent: Apr. 17, 2001

(54) OIL SUMP ARRANGEMENT WITH INTEGRAL FILTER AND HEAT EXCHANGER

(75) Inventor: Brian Thomas Lee, Charlotte, NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/369,276

(22) Filed: Aug. 6, 1999

(51) Int. Cl.$^7$ .......................... B01D 35/027; B01D 35/18
(52) U.S. Cl. .......................... 210/168; 210/172; 210/184; 210/186; 210/416.5
(58) Field of Search .................................. 210/172, 168, 210/184, 186, 416.5; 123/196 A, 196 AB; 184/6.24

(56) References Cited

U.S. PATENT DOCUMENTS

| | | |
|---|---|---|
| 1,305,355 | 6/1919 | Gulick . |
| 1,874,585 | 8/1932 | Newcomb . |
| 2,063,436 | 12/1936 | Hild . |
| 2,577,188 | 12/1951 | Hall . |
| 2,796,239 | * 6/1957 | Holmes . |
| 3,168,468 | 2/1965 | Jagdmann . |
| 3,232,283 | 2/1966 | Toland . |
| 4,352,737 | * 10/1982 | Taniguchi . |
| 4,878,536 | 11/1989 | Stenlund . |
| 5,408,965 | 4/1995 | Fulton et al. . |
| 5,863,424 | * 1/1999 | Lee . |
| 5,937,817 | 8/1999 | Schanz et al. . |
| 6,013,179 | * 1/2000 | Laughlin et al. . |

FOREIGN PATENT DOCUMENTS

| | | |
|---|---|---|
| 63-225758 | * 9/1988 | (JP) . |
| 7-103318 | * 4/1995 | (JP) . |

* cited by examiner

Primary Examiner—Thomas M. Lithgow
(74) Attorney, Agent, or Firm—Millen, White, Zelano & Branigan, P.C.

(57) ABSTRACT

In order to make more compact drive train and engine configurations, filter media and oil coolers are mounted within transmission oil pans and/or lubricating oil pans. Preferably, the heat exchanger is mounted on the upstream side of the filter media to cool the oil before the oil passes through the filter media and is recirculated by an oil pump. It is also preferable that both the filter media and the heat exchanger are integrally molded with a panel which is removably inserted into the oil pan to separate the oil pan into a first chamber, which is an upper chamber, and a second chamber, which is a lower chamber, so that oil drained into the upper chamber pools in the lower chamber and is recirculated back through the transmission or engine by a suction tube communicating with the lower chamber.

14 Claims, 2 Drawing Sheets

OIL SUMP ARRANGEMENT WITH INTEGRAL FILTER AND HEAT EXCHANGER

FIELD OF THE INVENTION

The present invention relates to an oil sump arrangement with an integral filter and heat exchanger. More particularly, the present invention relates to an oil sump with an integral filter media and heat exchanger useful for treating transmission oil or lubricating oil used in a drive train, such as a drive train including an internal combustion engine having a radiator for circulating engine coolant.

BACKGROUND OF THE INVENTION

New automotive designs increasingly reduce underhood space while simultaneously increasing cooling requirements of engines and transmissions. Accordingly, engine and drive train configurations which provide more efficient packaging of oil coolers are needed. Currently, transmission oil coolers tend to be separate units which project out into underhood space. This is especially a problem with front wheel drive vehicles that have both the engine and transmission disposed under the hood along with the radiator. Since vehicles now have other cooling needs, removal of the transmission oil cooler releases additional space for these needs. Moreover, transmission oil needs to be filtered to remove impurities and occasional metal filings and other debris therefrom. When filters are placed under the hood, the filters of course consume valuable space which might be needed for other purposes.

Typically, vehicles which are equipped with automatic, manual or semi-manual transmissions having recirculated transmission oil, cool the oil with a heat exchanger so that excessive heat build-up does not damage fragile engine parts. The usual location of the heat exchanger is near the radiator with hot transmission oil being pumped through small pipes to the heat exchanger. Coolant from the radiator is circulated through the heat exchanger to draw heat out of the oil and the cooled oil is then returned to the transmission. Traditionally, internal combustion engines use a spin-on oil filter, which of course projects out of an engine and consumes considerable space. In some automotive designs, an oil cooler is utilized in addition to the spin-on filter. Both the oil cooler and spin-on filter consume valuable space which can be used for other purposes as well as being used to provide additional space for engine access needed for service.

SUMMARY OF THE INVENTION

In view of the aforementioned considerations, it is a feature of the present invention to more efficiently package filter elements and heat exchangers for treating transmission oil and/or lubricating oil utilized in drive trains having coolant systems associated therewith.

In view of this feature and other features, an arrangement for treating oil circulated in a drive train including an engine, a transmission and a coolant source comprises a sump pan having side walls and horizontally extending floor, wherein the sump pan includes an oil suction tube for returning oil pooled on the floor to the drive train. A panel is disposed in the sump pan in spaced relation to the floor thereof to divide the sump pan into a first chamber and a second chamber. The panel has an opening therethrough for connecting the two chambers in which a filter media is disposed. Oil collected in the first chamber passes through the filter media and pools in the second chamber, from which second chamber the oil is returned to the drive train by the suction tube. A heat exchanger is disposed in one of the chambers for cooling oil circulating through the sump pan, the heat exchanger being connected to the coolant source.

In a more specific aspect, the heat exchanger is integral with a panel, and in still a more specific aspect, the panel has an upstream surface facing into the first chamber and a downstream surface facing into the second chamber with the heat exchanger being on the upstream surface so as to cool the oil prior to the oil being filtered by the filter media.

In still a further embodiment, the panel, the filter media and the heat exchanger form an integral unit which is disposed within the sump pan and is separable therefrom.

In still further aspects of the invention, the arrangement is used to treat transmission oil or lubricating oil.

DETAILED DESCRIPTION

Figure 1:
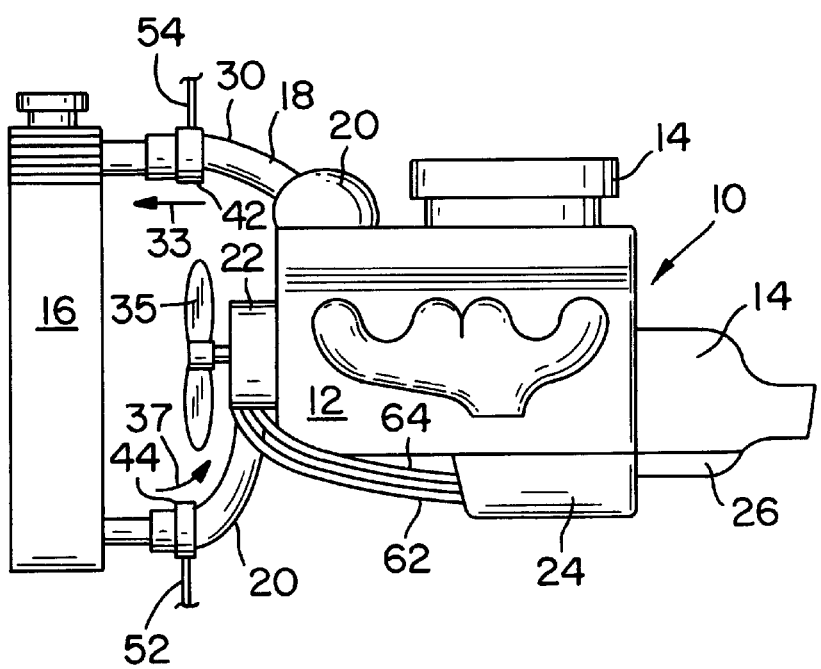
FIG. 1 is a side view of an internal combustion engine and transmission which comprise a drive train, the internal combustion including a radiator.

Referring now to FIG. 1, there is shown an engine drive train 10 which includes an internal combustion engine 12 and a transmission 14, the transmission may be an automatic transmission, a manual transmission or a semi-manual transmission. The internal combustion engine 10 is cooled by a radiator 16 which circulates coolant from the engine via a line 18 and returns the coolant to the engine via a line 20 by using a coolant pump 22. The engine 12 includes an oil sump pan 24 for pooling lubricating oil and the transmission includes an oil sump pan 26 for pooling transmission oil.

Figure 2:
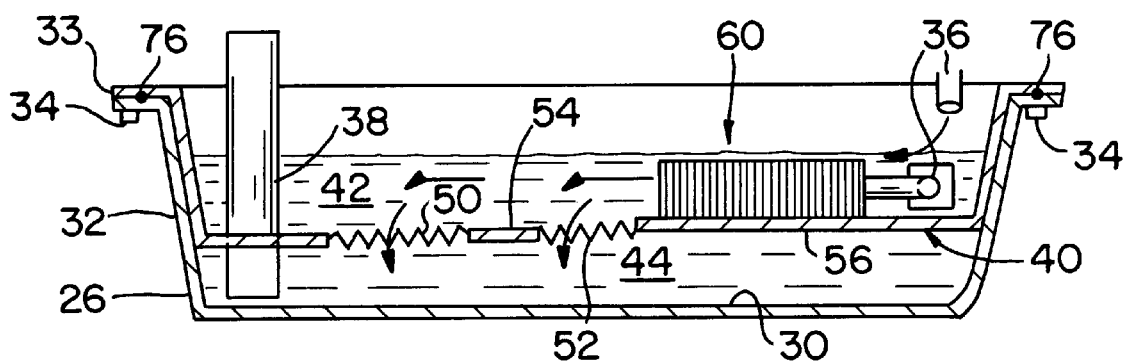
FIG. 2 is a side view of an oil sump used with the internal combustion engine of FIG. 1.
Figure 3:
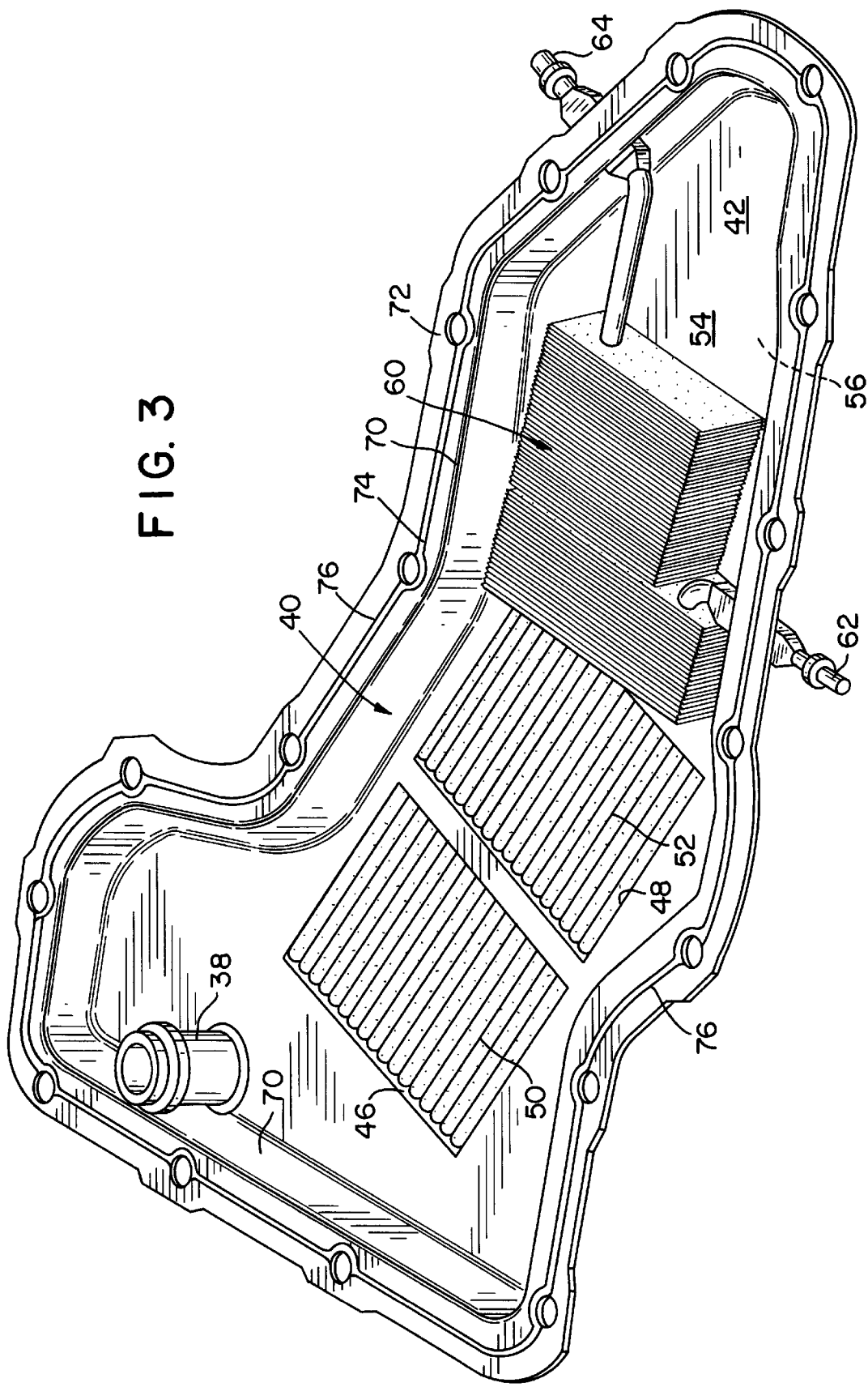
FIG. 3 is a perspective view of a panel insert used with the oil sump of FIG. 2.

Referring now to FIGS. 2 and 3, where aspects of the transmission oil pan 26 are shown, it is seen that the transmission oil pan provides an arrangement for treating oil circulated in the drive train 10 of FIG. 1 which includes an engine 12, a transmission 14 and a coolant source in the form of the radiator 16. As is seen in FIG. 2, the transmission oil pan 26 is configured as a sump pan with a floor 30 and a side wall 32. The transmission oil pan 26 is connected to the bottom of the transmission 14 by a plurality of bolts 33 received through holes in a peripheral flange 34. Oil enters the sump pan 26 through a drain 36 from the transmission 14 (FIG. 1) and is returned to the transmission by a suction tube 38 connected to a suction pump (not shown).

In accordance with the present invention, a panel 40 (see mainly FIG. 3) is disposed within the transmission oil pan 26 and divides the pan into a first chamber 42 and a second chamber 44. The panel 42 has at least one opening completely therethrough and as seen in FIG. 3, preferably has two openings 46 and 48 therethrough. Positioned within the openings 46 and 48 are pleated filter media 50 and 52, respectively. While pleated filter media 50 and 52 are illustrated, the filter media may also be of other configurations, but generally have the geometric form of panel-type filter media. The panel 42 has an upstream surface 54 which faces into the first chamber 42 and a downstream surface 56 which faces into the second chamber 44.

Disposed on the upstream surface 54 is a heat exchanger 60 which has a coolant inlet tube 62 and a coolant outlet tube 64 which are connected to the coolant pump 22 of FIG. 1 so that coolant which has been cooled by the radiator 16 is pumped through the heat exchanger 60 as the engine 12 runs. The heat exchanger 60 is disposed on the upstream side of the filter media 50 and 52 so as to cool oil from the drain 36 before the oil is filtered. After the oil flows over the heat exchanger 60, it passes through the filter media 50 and 52 into the second chamber 44 (FIG. 2), where it pools and is thereafter sucked from the second chamber by the suction tube 38. The action of the suction tube 38 creates a lower pressure on downstream surfaces 66 and 68 of filter media 50 and 52 which pulls oil accumulating in the first chamber 42 through the filter media.

The panel 40 is generally irregular in shape and has a peripheral sidewall 70 which encloses the first chamber 42. The sidewall 70 has a laterally projecting flange 72 which abuts the transmission housing and is sandwiched between the flange 34 on the sidewall 32 of the transmission oil pan 26 and the bottom surface of the transmission 14. The panel 70 is held in place by the bolts 32 (see FIG. 2). Molded into the flange 72 is a groove 74 in which an integral gasket 76 is mounted.

Preferably, the pleated filter media 50 and 52 are molded into the nylon panel 40 as is the heat exchange unit 60. Moreover, the coolant inlet tube 62 and coolant outlet tube 64 are preferably molded into the sidewall 70 and the suction tube 38 which provides the fluid return is preferably molded into the panel 40. Although any suitable material may be used, the preferable material for the panel 40 is NYLON® (polyamide).

While a transmission oil pan 26 has been discussed, it is to be understood that the lubricating oil pan 24 can be similarly configured, i.e., to have at least one filter media, such as the filter media 50 and 52 molded therein and a heat exchanger, such as the heat exchanger 60, molded therein. Consequently, lubricating oil can be treated by being first cooled by a heat exchanger 60 and thereafter filtered by filter media 50 and 52 before being returned to the engine 12 via a suction tube 38.

By mounting both the heat exchanger and filter media within the transmission oil pan 26 and/or mounting the lubricating oil filter and lubricating oil cooler in a lubricating oil pan 24, a more compact drive train 10 and engine arrangement is achievable which releases good space for other purposes such as, for example, increasing the size of an engine cooling system.

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

What is claimed is:

1. An arrangement for treating oil circulated in a drive train including an engine, a transmission and a coolant source, the arrangement comprising:

a sump pan having side walls and a horizontally extending floor, the sump pan including a fluid suction tube for returning liquid pooled on the floor to the drive train, a panel removeably disposed in the sump pan in spaced relation to the floor to divide the sump pan into a first chamber and a second chamber, the panel having an upstream surface facing into the first chamber and a downstream surface facing into the second chamber and the panel having an opening therethrough for connecting the two chambers, a filter media integral with the panel disposed in the opening, through which filter media the liquid flows for pooling in the second chamber to be returned to the drive train by the suction tube; and a heat exchanger integral with the panel and disposed on the upstream surface of the panel for cooling oil prior to the oil passing through the filter media.

2. The arrangement of claim 1, wherein the panel is molded of polyamide.

3. The arrangement of claim 1, wherein there is an oil return tube integral with the panel.

4. The arrangement of claim 1, wherein the heat exchanger is connected to an inlet tube and an outlet tube which are integral with the panel and extend through peripheral walls thereof.

5. The arrangement of claim 1, wherein the sump pan is a transmission sump pan, the oil is transmission oil and wherein the source of coolant is liquid circulated through an engine radiator.

6. The arrangement of claim 1, wherein the sump pan is a lubricating oil pan, the oil is lubricating oil and the source of coolant is liquid circulated through an engine radiator.

7. An arrangement for treating oil circulated in a drive train including an engine, a transmission, a coolant source and a sump pan having side walls and a horizontally extending floor, the sump pan including a fluid suction tube for returning liquid pooled on the floor to the drive train, the arrangement comprising:

a panel adapted to be removeably disposed in the sump pan in spaced relation to the floor and adapted to divide the sump pan into a first chamber and a second chamber, the panel having an upstream surface adapted to face into the first chamber and a downstream surface facing into the second chamber and the panel having at least one opening therethrough for connecting the two chambers, a filter media integral with the panel disposed in the opening, through which filter media the liquid flows for pooling in the second chamber to be returned to the drive train by the suction tube; and a heat exchanger integral with the panel and disposed on the upstream surface of the panel for cooling oil prior to the oil passing through the filter media.

8. The arrangement of claim 7, wherein the panel is molded of polyamide.

9. The arrangement of claim 7, wherein there is an oil return tube integral with the panel.

10. The arrangement of claim 7, wherein the heat exchanger is connected to an inlet tube and an outlet tube which are integral with the panel and extend through peripheral walls thereof.

11. The arrangement of claim 7, wherein the sump pan is a transmission sump pan, the oil is transmission oil and wherein the source of coolant is liquid circulated through an engine radiator.

12. The arrangement of claim 7, wherein the sump pan is a lubricating oil pan, the oil is lubricating oil and the source of coolant is liquid circulated through an engine radiator.

13. The arrangement of claim 7 wherein there are two openings through the pan, each opening having a filter media therein which is integral with the pan.

14. The arrangement of claim 7 wherein the panel has a side wall which extends upwardly therefrom a selected distance and a peripheral flange, wherein the selected distance is adapted to be less than the depth of the pan and wherein the peripheral flange is adapted to attach the panel to the drive train within the pan.

* * * * *